United States Patent [19]

Krieger, deceased et al.

[11] Patent Number: 4,852,852
[45] Date of Patent: Aug. 1, 1989

[54] HYDRAULIC VALVE ACTUATING DEVICE

[75] Inventors: Karl Krieger, deceased, late of Wuppertal, Fed. Rep. of Germany, by Hildegard Krieger, legal representative; Werner Reinelt, Bochum; Wolfgang Kobow, Wuppertal, both of Fed. Rep. of Germany

[73] Assignee: Hermann Henscheidt Maschinenfabrik GmbH & Co., Wuppertal, Fed. Rep. of Germany

[21] Appl. No.: 196,685

[22] Filed: May 20, 1988

[30] Foreign Application Priority Data

May 23, 1987 [DE] Fed. Rep. of Germany ....... 3717403

[51] Int. Cl.⁴ ............................................. F16K 31/44
[52] U.S. Cl. ..................... 251/78; 251/245; 251/322
[58] Field of Search ............... 251/78, 79, 234, 244, 251/245, 246, 322, 323, 243

[56] References Cited

U.S. PATENT DOCUMENTS

| | | | |
|---|---|---|---|
| 677,940 | 7/1901 | Carr | 251/78 |
| 814,421 | 3/1906 | Austin | 251/234 |
| 1,204,520 | 11/1916 | Tuttle | 251/246 |
| 2,287,548 | 6/1942 | Broden | 251/78 |
| 2,339,378 | 1/1944 | Clench et al. | 251/78 |
| 4,017,221 | 4/1977 | Dezelan | 251/78 |
| 4,694,862 | 9/1987 | Rott | 137/625.5 |

FOREIGN PATENT DOCUMENTS

| | | | |
|---|---|---|---|
| 1120914 | 7/1956 | France | 251/78 |
| 774312 | 5/1957 | United Kingdom | 251/78 |

Primary Examiner—George L. Walton
Attorney, Agent, or Firm—Berman, Aisenberg & Platt

[57] ABSTRACT

A 2-port, 2-directional hydraulic valve is disposed alongside a pulse generator in a casing, the actuating force of the pulse generator being transmitted to a push rod of the valve for actuating the latter via a two-armed lever mounted like the beam of a balance. A threaded bore in one lever arm receives a bush which is adjustable in the direction of actuation and contains a spring-loaded pressure member. A set screw can be used to pre-stress the spring and thus exactly adjust the transmitted actuating force, while the adjustable bush is used for pre-setting the actuating travel.

4 Claims, 1 Drawing Sheet

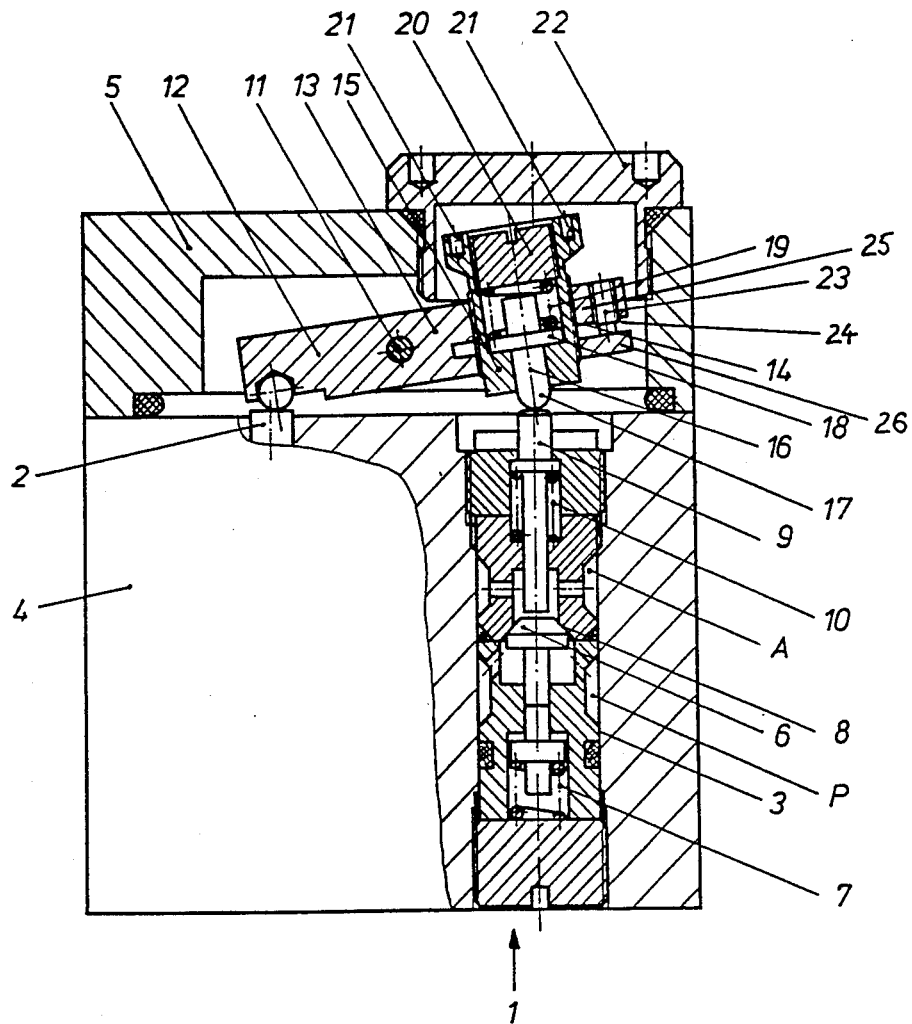

HYDRAULIC VALVE ACTUATING DEVICE

This invention relates to a device for actuating an hydraulic control valve comprising a closure member loaded by a spring and adjustable into the actuating position by a push rod held in the starting position by a return spring, the device having a two-armed lever mounted like a balance beam for transmitting movement of a pulse generator to the push rod.

DE-AS No. 18 11 248 discloses an actuating device for the control of hydraulic timbering and walling wherein pressure pulses are transmitted by a pneumatic pulse generator to actuate an hydraulic change-over valve. The actuating force of the pulse generator is transmitted via a two-armed lever mounted like the beam of a balance. A push rod for the transmission of force which is held in the starting position by a pre-stressed return spring is disposed alongside the pulse generator. On the side of the valve, the actuating force of the lever arm is directly transmitted to the closure member which is pressed against a valve seat by a spring when the valve is in the starting position. During the actuation movement the closure member is moved against the force of the spring into the actuating position in which the valve is opened.

This valve is bulky and is designed to exert maximum actuating forces on the closure member in response to relatively weak pressure pulses without the need for exact transmission of force. The valve cannot be adjusted to exactly pre-set actuating forces.

In an actuating device according to DE-PS No. 33 44 925, a pre-stressed spring buffer is inserted between the lever arm and the push rod for actuating the valve, the distance between the buffer and the lever arm being adjustable by a conical screw disposed thereon. This device can admittedly compensate some differences in the dimensions of the actuating device due to tolerances but no changes can be made on the spring buffer so as to influence the actuating force of the valve. The buffer also increases the overall length of the actuating device.

The aim of the present invention is to construct a device for actuating an hydraulic control valve which is small and which is very accurately adjustable to pre-set actuating forces and travel.

With this aim in view, an hydraulic valve actuating device in accordance with the opening paragraph of this specification comprises a two-armed lever mounted like the beam of a balance for transmitting movement of a pulse generator to the push rod, a bush adjustable in the actuation direction disposed in the lever arm on the side of the valve, and a pressure member adjustable to a pre-set actuating force axially guided in the bush, the pressure member being provided with a part-spherical head abutting the push rod.

An actuating device according to the invention for transmitting actuating forces from a pulse generator to a valve can therefore have very small dimensions and can respond very accurately to the pre-set force for actuating the valve. The pressure member inserted in the bush of the lever arm associated with the valve is exactly adjusted to the required actuating force via the pre-stress on the spring. If the force delivered by the pulse generator is likely to vary during operation, the pre-stress at the pressure member is adjusted so that the valve is reliably actuated even if there is a decrease in the delivered force. The spring in the bush yields if the actuating force exceeds the preset valve. Depending on the stroke of the pulse generator, the bush can be adjusted so that the part-spherical head of the pressure member abuts the push rod exactly at the pressure point with the result that the push rod moves the exact stroke for the closure member. One important feature is that the required adjustments can be made by simple means, in a confined space, when the complete valve system is assembled.

The invention will now be explained in detail with reference to a specific embodiment shown in the accompanying drawing, wherein the single Figure shows, in section, a device for transmitting actuating forces from a pulse generator to a 2-port, 2-directional hydraulic valve.

The 2-port, 2-directional hydraulic valve 1 shown in the drawing is disposed alongside a pulse generator 2 (details not shown) in a bore 3 in a casing 4 closed by a cover 5. When the valve 1 is in the starting position, a closure member 6 is pressed by a spring 7 against a sealing-tight valve seat 8 and seals pressure fluid arriving at a high-pressure connection P against a load connection A. the valve 1 is actuated by a push rod 9 and is held in the starting position by a return spring 10. When the rod 9 is pushed downward, the valve 1 is brought into the actuating position in which the closure member 6 is lifted from the valve seat 8 and the high-pressure connection P is connected to the load connection A.

The actuating force exerted by the pulse generator 2 is transmitted by a two-armed lever 12, 13 mounted for pivotal movement like the beam of a balance on a shaft 11 in the casing 4 to the push rod 9 of the valve 1, the lever having an arm 12 on the side of a pulse generator 2 and an arm 13 on the side of the valve 1. The arm 13 which at its end has a horizontal notch (not shown), is formed with a screw-threaded bore 14 in which a pot-shaped bush 15 is screwed so as to be adjustable in the actuation direction. The bush 15 contains a pressure member or pin 16 having a part-spherical head 17 emerging from the bush at one end and, in its central longitudinal region, a collar 18 on which a spring 19 rests. The spring 19 is pre-stressed by a set screw 20 tapped from the outer surface into the bush 15. The spring 19 therefore presses the collar 18 of the member 16 into the bush 15, and the part-spherical head 17 projects from bush 15 through a bore (not shown). The outward surface of the bush 15 is formed with bores 21 for receiving a pin wrench (not shown) for adjusting the bush 15 in the actuating direction in the screw-threaded bore 14.

The above-described actuating device can be adjusted exactly to differences in overall dimensions due to tolerances and also to pre-set actuating forces. For the purpose of adjustment, a closure cap 22 is removed from the cover 5. The pre-stress on the spring 19 is set at screw 20 so as to pre-set the actuating force acting on the valve 1. If the force exerted by the pulse generator 2 exceeds the pre-set spring force during an actuation operation, the spring 19 yields and the pressure member 16 moves in the axial direction. A pin wrench engaging in the bores 21 sets the bush 15 so that the distance travelled by the push rod 9 exactly coincides with the stroke of the closure member 6. The bush 15 is clamped in the threaded bore 14 by tightening a locking screw 23 extending between two end portions 25 and 26 of the lever arm 13 which are separated from each other by a slot 24 in the lever arm.

We claim:

1. A device for actuating an hydraulic control valve comprising a closure member, a spring loading the closure member, a push rod arranged to adjust the closure member into an actuating position, and a return spring serving to hold the push rod in the starting position, wherein the actuating device comprises a two-armed lever mounted like the beam of a balance for transmitting movement of a pulse generator to the push rod, a bush being disposed within said lever and adjustable in the actuation direction of the lever arm on the side of the valve, a pressure member being disposed within said bush and supported by the bush so as to be axially guided with respect thereto, a part-spherical head on the pressure member arranged to abut the push rod of the valve, a spring supported by the bush and bearing on the pressure member so as to urge the pressure member towards the valve push rod, and an adjustable set screw disposed within said bush and arranged to act on the spring whereby adjustment of the set screw is adapted to pre-stress the spring to an extent corresponding to a pre-set force for actuating the valve push rod.

2. A device according to claim 1, wherein the said lever arm has a screw-threaded bore for receiving the bush and wherein the pressure member has a collar against which the spring bears.

3. A device according to claim 2, wherein the bush is lockable in the screw-threaded bore by a locking screw extending between two end portions of the lever arm which are separated from each other by a slot in the lever arm.

4. A device according to claim 1, wherein the outer end face of the bush is formed with bores for receiving a pin wrench.

* * * * *